United States Patent
Sarashina

(10) Patent No.: US 8,280,252 B2
(45) Date of Patent: Oct. 2, 2012

(54) SUBSCRIBER TERMINAL OF ADJUSTING INTENSITY OF OPTICAL SIGNAL BY CONTROLLING ATTENUATION, AND A METHOD THEREOF

(75) Inventor: Masahiro Sarashina, Saitama (JP)

(73) Assignee: Oki Electric Industry Co. Ltd., Tokyo (JP)

( * ) Notice: Subject to any disclaimer, the term of this patent is extended or adjusted under 35 U.S.C. 154(b) by 328 days.

(21) Appl. No.: 12/801,356

(22) Filed: Jun. 4, 2010

(65) Prior Publication Data

US 2011/0008046 A1    Jan. 13, 2011

(30) Foreign Application Priority Data

Jul. 13, 2009  (JP) .................................. 2009-164631

(51) Int. Cl.
*H04J 14/00* (2006.01)
(52) U.S. Cl. .............................. 398/71; 398/70; 398/155
(58) Field of Classification Search ..................... 398/71, 398/70, 72, 58, 66, 154, 155
See application file for complete search history.

(56) References Cited

U.S. PATENT DOCUMENTS

| 6,222,660 | B1 * | 4/2001 | Traa ............................... 398/213 |
| 7,239,813 | B2 * | 7/2007 | Yajima et al. .................. 398/154 |
| 7,630,642 | B2 | 12/2009 | Tamai et al. |
| 7,725,033 | B2 * | 5/2010 | Nakamoto ....................... 398/95 |
| 2009/0034973 | A1 * | 2/2009 | Sakamoto et al. .............. 398/58 |

* cited by examiner

*Primary Examiner* — M. R. Sedighian
(74) *Attorney, Agent, or Firm* — Rabin & Berdo, P.C.

(57) ABSTRACT

A subscriber terminal connected to a central-office unit in an optical communication network includes a variable optical attenuator for attenuating an optical signal received from the central-office unit; an optical-electric converter for converting the optical signal received via the attenuator to a corresponding electric signal; a clock extractor for extracting a clock from the electric signal and producing a clock extraction information signal representing whether or not the clock is extracted stably; and a terminal controller. The controller includes a clock extraction decider for determining whether or not the extractor stably extracts the clock on the basis of the information signal, a receiving level adjuster for setting an attenuation value to a value between a minimum and a maximum value, and an attenuation controller for setting the attenuation amount for the attenuator to the set attenuation value.

14 Claims, 4 Drawing Sheets

SUBSCRIBER TERMINAL OF ADJUSTING INTENSITY OF OPTICAL SIGNAL BY CONTROLLING ATTENUATION, AND A METHOD THEREOF

BACKGROUND OF THE INVENTION

1. Field of the Invention

The present invention relates to a subscriber terminal, particularly for use in a passive optical communication network (PON) in which a plurality of subscriber terminals are connected for communication to a central-office unit. The invention also relates to a method for adjusting the intensity of an optical signal in such a subscriber terminal.

2. Description of the Background Art

As a typical example of a communication system between a central-office unit and a plurality of subscriber terminals, a passive optical network (PON) is known. The PON system includes a single central-office unit, a plurality of subscriber terminals and an optical splitter, which interconnects the central-office unit and the subscriber terminals with optical fibers. Applications where the PON system is collaborated with the code division multiplexing (CDM) scheme can enjoy various advantages inherent to the CDM scheme.

Telecommunications network systems utilizing the CDM scheme use a code common to both transmitter and receiver sides, thus accomplishing high security for communication. Additionally, the network system utilizing the CDM scheme allows transmission data from plural sources to be multiplexed in a single time slot. The use of the CDM scheme thus accomplishes a larger capacity of data communications with communication resources, such as time slots, saved as referred to in U.S. Pat. No. 7,630,642 B1 to Tamai et al., for example.

Optical fibers for use in the PON system bring an attenuation rate of about 0.5 dB/km. In such a case, a subscriber terminal residing at a distance from the optical splitter further than another subscriber terminal by 10 km, for example, may receive an optical signal transmitted by the central-office unit weaker in optical intensity than the other subscriber terminal by about 5 dB. If the subscriber terminals have the tolerable range thereof, i.e. dynamic or receivable range, equal to about 5 dB, some of the subscriber terminals distancing themselves from the optical splitter further than others by 10 km or more may receive optical signals out of the dynamic ranges, thus failing to properly receive the optical signals.

Particularly, when the PON system is powered on to perform a presence check for the subscriber terminals by the central-office unit, the subscriber terminals may receive a too strong intensity of optical signals transmitted by the central-office unit, thus failing to properly receive the signals. As a result, the central-office unit may not able to check the presence of the subscriber terminals.

SUMMARY OF THE INVENTION

It is therefore an object of the present invention to provide a subscriber terminal for use in a passive optical communication network capable of receiving, when its presence is checked, an optical signal with its intensity kept within the dynamic range. It is also an object of the invention to provide such a method for adjusting the intensity of an optical signal.

In accordance with the present invention, a subscriber terminal for use in an optical communication network including a central-office apparatus comprises a variable optical attenuator, an optical-electric converter, a clock extractor, and a controller. The variable optical attenuator attenuates an optical signal received from the central-office apparatus. The optical-electric converter converts the optical signal received via the variable optical attenuator to a corresponding electric signal. The clock extractor extracts a clock from the electric signal and produces a clock extraction information signal representing whether or not the clock is extracted stably.

The controller controls the variable optical attenuator, and includes a clock extraction decider, a receiving level adjuster and an attenuation controller. The clock extraction decider determines whether or not the clock extractor stably extracts the clock on the basis of the clock extraction information signal. The receiving level adjuster sets an attenuation value to a value between a minimum value and a maximum value, which are predetermined. The attenuation controller sets an attenuation amount for the variable optical attenuator to the attenuation value.

Further in accordance with the invention, an optical communication network includes the above-described subscriber terminal.

Still further in accordance with the invention, a method for adjusting the intensity of a downstream optical signal received by the subscriber terminal in the optical communication network includes the following steps. First, an attenuation amount for a variable optical attenuator is adjusted to one predetermined extreme value, minimum or maximum. Next, it is determined whether or not a clock extractor included in the subscriber terminal stably extracts the clock. It is further determined, when determining that the clock is not extracted stably, whether or not the attenuation amount is equal to the other predetermined extreme value, maximum or minimum. When the attenuation amount is equal to the other extreme value, the attenuation amount is subsequently changed to the one extreme value. Otherwise, namely, when the attenuation amount is not equal to the other extreme value, the attenuation amount is subsequently changed by one stage toward the other extreme value. It is then determined whether or not the clock extractor stably extracts the clock.

According to the present invention, the subscriber terminal controls the attenuation amount for the optical signal received from the central-office apparatus, for example, when having its presence checked. That makes the intensity of the optical signal received by the subscriber terminal kept within the dynamic range to thereby ensure reception of a presence check request signal from the central-office apparatus.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

A preferred embodiment of the present invention will So far as the positional relationship of the components is concerned, the figures conceptually show them merely to the extent of understanding the invention. The preferred embodiment of the present invention will be described with the numerical conditions or the like are just exemplified. Therefore, the present invention is not understood restrictive to the specific embodiment. Those skilled in the art may change or modify the illustrative embodiment so as to accomplish the advantages of the present invention without departing from the scope and spirit of the present invention.

Figure 1:
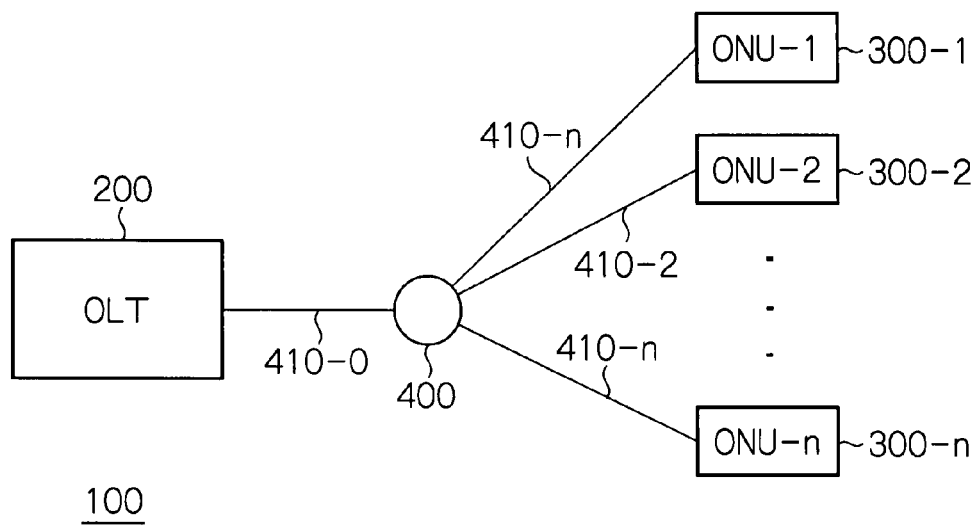
FIG. 1 is a schematic block diagram showing a PON system according to a preferred embodiment of the present invention.

As an example of optical communication networks according to the embodiment of the invention, a passive optical network (PON) system 100 will be described with reference to FIG. 1. The PON system 100 includes a single central-office unit, or an optical line terminal (OLT), 200, which is interconnected to an optical splitter 400 by an optical fiber 410-0. The optical splitter 400 is further interconnected to a plurality (n) of subscriber terminals, or optical network units (ONUs), 300-1 to 300-n by a corresponding plurality of optical fibers 410-1 to 410-n, where n is an integer equal to or more than two. In the context, the optical network units 300-1 to 300-n and the optical fibers 410-1 to 410-n, may sometimes be designated simply with 300 and 410, respectively.

Figure 2:
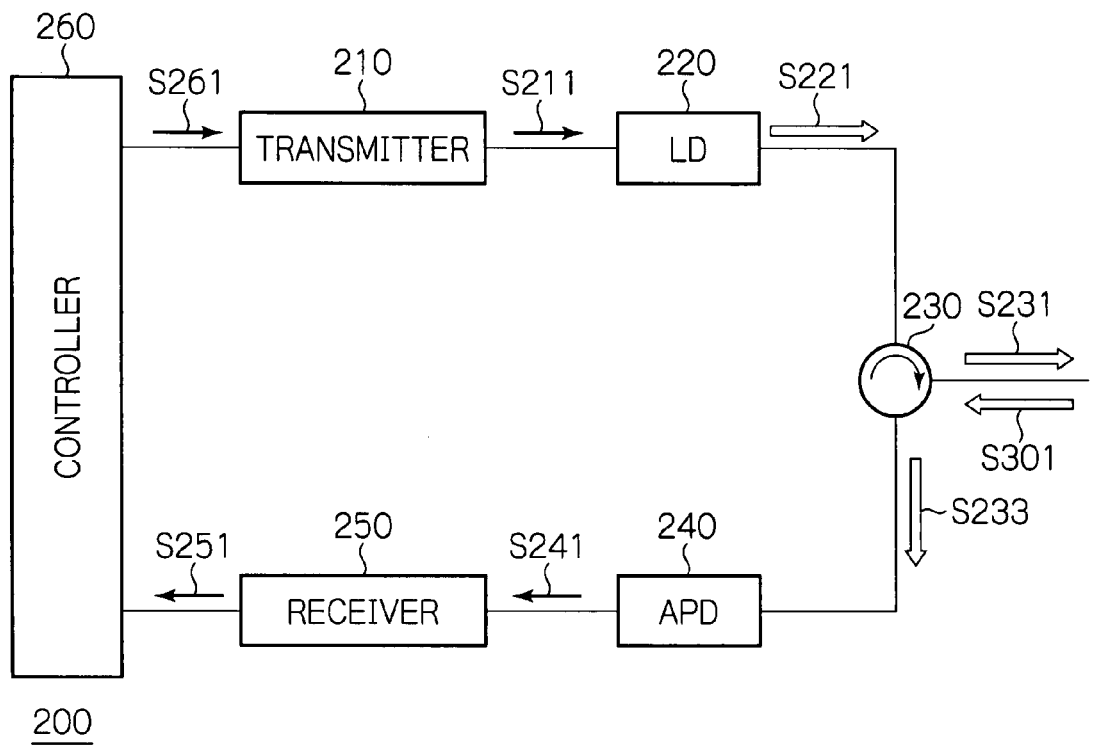
FIG. 2 is a schematic block diagram showing the optical line terminal of the PON system shown in FIG. 1.

The configuration of the optical line terminal 200 in the PON system 100 will be described with reference to FIG. 2. The optical line terminal 200 generally includes a transmitter 210, an electric-optical converter 220, an optical multiplexer/demultiplexer 230, an optical-electric converter 240, a receiver 250 and a central-office controller 260, which are interconnected as shown.

The transmitter 210 includes, for example, an encoder and an addition multiplexer, not specifically shown, and is adapted to receive transmission data, indicated by a thin arrow S261 in the figure, from the central-office controller 260 to produce a code division multiplexed (CDM) signal S211. In the PON system 100 including the plurality (n) of optical network units 300-1 through 300-n, the CDM signal S211 has n channels of signals multiplexed. The transmitter 210 sends the generated CDM signal S211 to the electric-optical converter 220.

The electric-optical converter 220 is an electro-optical conversion device advantageously comprising, for example, a laser diode (LD) to convert the CDM signal S211 in the form of electric signal to a corresponding CDM optical signal depicted with a thick arrow S221 in the figure. The electric-optical converter 220 transfers the CDM optical signal S221 to the optical multiplexer/demultiplexer 230.

The optical multiplexer/demultiplexer 230 may advantageously comprise, for example, an optical circulator. The optical multiplexer/demultiplexer 230 is adapted to receive the CDM optical signal S221 from the electric-optical converter 220 and transmit the received signal S231 to the respective optical network units 300. The optical multiplexer/demultiplexer 230 is also adapted to receive the CDM optical signal S301 from the respective optical network units 300 and transfer the received signal S233 to the optical-electric converter 240.

The optical-electric converter 240 may advantageously comprise, for example, an avalanche photodiode (APD) adapted to convert the CDM optical signal S233 to a corresponding CDM signal S241 in the form of electric signal. The optical-electric converter 240 sends the CDM signal S241 to the receiver 250.

The receiver 250 may advantageously comprise, for example, a charge-coupled device (CCD) matched filter and a comparator, not shown. The CCD matched filter is adapted to calculate the convolution of the CDM signal S241 with a code assigned to the CCD matched filter. The comparator is adapted to obtain received data S251 from a correlation signal resultant from the convolution calculation by the CCD matched filter. The receiver 250 sends the received data S251 to the central-office controller 260.

The central-office controller 260 may advantageously comprise, for example, a field programmable gate array (FPGA). The central-office controller 260 may be designed to implement desired functions, such as generation of the transmission data S261, an analysis on the header of the received data S251 and a presence check of each optical network unit 300, which are necessary for communication over the PON system 100 by means of the CDM scheme.

Now, with reference to FIG. 3, description will be made on the configuration of the optical network unit 300, which may be any of the optical network units 300-1 to 300-n, which are the same in structure and function as each other. The optical network unit 300 generally includes a transmitter 310, an electric-optical converter 320, an optical multiplexer/demultiplexer 330, an optical-electric converter 340, a receiver 350, a terminal controller 360, a variable optical attenuator (VOA) 370, a clock generator 380 and a clock extractor 390, which are interconnected as depicted.

The variable optical attenuator 370 functions as attenuating an optical signal S371 to be transmitted by the optical network unit 300 toward the optical line terminal 200, often referred to as upstream optical signal, and another optical signal S201 received by the optical network unit 300 from the optical line terminal 200, often referred to as downstream optical signal by a common amount of attenuation.

The transmitter 310 may advantageously comprise, for example, an encoder adapted to encode transmission data S361 received from the terminal controller 360 by a code assigned to that optical network unit 300 to thereby generate a code spread signal. The transmitter 310 sends the generated code spread signal S311 to the electric-optical converter 320.

The electric-optical converter 320 may advantageously comprise, for example, a laser diode (LD) adapted to convert the code spread signal S311 in the form of electric signal to a corresponding code spread optical signal S321. The electric-optical converter 320 sends the code spread optical signal S321 to the optical multiplexer/demultiplexer 330.

The optical multiplexer/demultiplexer 330 may advantageously comprise, for example, an optical circulator, which is adapted to receive the code spread optical signal S321 from the electric-optical converter 320 and send the received signal S333 to the variable optical attenuator 370. The code spread optical signal S371, when transmitted via the variable optical attenuator 370 toward the optical line terminal 200, is combined by the optical splitter 400, FIG. 1, with other code spread optical signals transmitted from other optical network units 300 to be converted to a CDM optical signal 410-0. The optical line terminal 200 receives this CDM optical signal 400-0 as a signal from the respective optical network units 300. Thus, signals are designated with reference numerals of connections on which they are conveyed.

The optical multiplexer/demultiplexer 330 is also adapted for receiving a CDM optical signal S373 from the optical line terminal 200 via the variable optical attenuator 370 and sends the received signal S331 to the optical-electric converter 340.

The optical-electric converter 340 may advantageously comprise, for example, an avalanche photodiode (APD) adapted to convert the CDM optical signal S331 to a corresponding CDM signal in the form of electric signal. The CDM optical signal goes onto two separate routes so as to be sent on one route S341 to the receiver 350 and on another route S343 to the clock extractor 390.

The clock extractor 390 serves as extracting a clock signal from the CDM signal S343. The clock signal goes onto two separate routes so as to be sent on one route S391 to the receiver 350 and on another route S393 to the terminal controller 360.

The clock extractor 390 also produces a clock extraction information signal S395 representing whether or not a clock is extracted stably. The clock extraction information signal S395 is transferred to the terminal controller 360. The clock extractor 390 may advantageously comprise, for example, a clock data recovery (CDR) circuit, such as model ADN2812 manufactured by Analog Devices, Inc. This CDR circuit outputs a loss of lock (LOL) signal as the clock extraction information signal. The LOL signal takes its binary value "0" when the clock is stably extracted, and its binary value "1" when no clock is extracted.

The receiver 350 may advantageously comprise, for example, a CCD matched filter and a comparator. The CCD matched filter is adapted to use the clock signal S391 received from the clock extractor 390 to calculate a convolution of the CDM signal S341 with a code assigned to the CCD matched filter. The comparator is adapted for using a correlation signal resultant from a convolution calculation by the CCD matched filter to obtain received data S351. The receiver 350 sends the received data S351 to the terminal controller 360.

In the optical network unit 300, the transmitter 310 and the receiver 350 is operative in response to the clock extracted from the optical signal received from the optical line terminal 200 for carrying out encoding and decoding and adjusting the received-signal intensity as described later on. However, where a clock that would have been transmitted from the optical line terminal 200 cannot be extracted, as with presence check, a clock generated by the clock generator 380 is used. The clock generator 380 may be similar one used in a general PON system. Note that a similar clock generator is also provided in the optical line terminal 200 although a description is refrained from.

The terminal controller 360 may advantageously comprise, for example, a field programmable gate array (FPGA). The terminal controller 360 may be designed to implement desired functions, such as generation of CDM frames and an analysis on the header of the received data, which are necessary for communication over the PON system 100 by means of the CDM scheme.

In the illustrative embodiment in accordance with the present invention, in order to adjust the received-signal intensity, the terminal controller 360 of the optical network unit 300 includes a clock extraction decider 362, a receiving level adjuster 364 and an attenuation controller 366, which may advantageously be implemented by the FPGA programmed as such, or software stored therein. The illustrative embodiment of the terminal controller 360 is depicted and described as configured by separate functional blocks as above. It is however to be noted that such a depiction and a description do not restrict the terminal controller 360 to an implementation only in the form of hardware but at least the controller 360 may partially or entirely be implemented by software, namely, by an FPGA or a computer, so programmed or having a computer program installed and functions, when executing the computer program, as part of, or the entirety of, the terminal controller 360. In this connection, the word "circuit" maybe understood not only as hardware, such as an electronics circuit, but also as a function that may be implemented by software installed and executed on a computer.

The clock extraction decider 362 serves as using the clock extraction information signal S395 to determine whether or not the clock extractor 390 stably extracts the clock. The receiving level adjuster 364 serves as adjusting a set value of an attenuation amount for the variable optical attenuator 370. In the following description, the set value of an attenuation amount may often be referred to as an attenuation value or VOA value. The attenuation controller 366 is operative in response to a value set by the receiving level adjuster 364 to direct the variable optical attenuator 370 to change its attenuation amount.

Next, the presence check in the PON system 100 will be described. The presence check may be performed when the optical line terminal 200 and optical network units 300 are powered on, as in the case of starting up the PON system 100. Each optical network unit 200 waits for, when powered on, a signal to be transmitted from the optical line terminal 200. On the other hand, the optical line terminal 200 starts, when powered on, the presence check for the optical network units 300 involved in the PON system 100.

In operation, the optical line terminal 200 converts a frame including a header and a data signal to a CDM optical signal to transmit the latter signal to the optical network units 300. When performing a presence check, the line terminal 200 forms such a header including a presence check request. The optical network units 300 analyze the header of a received frame and checks whether or not the received signal includes the presence check request.

The optical network units 300 transmit, when finds the presence check request, a presence check request acknowledgement signal toward the optical line terminal 200. Upon the optical line terminal 200 having received the presence check request acknowledgement signal or a predetermined period of time having elapsed without receiving a presence check request acknowledgement signal, the presence check finishes.

In the prior art, during the course of presence checking, the distance of an optical network unit from the optical line terminal may cause the optical network unit to fail to receive an optical signal transmitted from the line terminal with its intensity out of the receivable or dynamic range of that optical network unit. In such a case, the optical network unit cannot receive the presence check request from the optical line terminal.

In order to overcome such a situation that would be caused in the prior art, the illustrative embodiment of the optical network unit 300 is adapted to adjust or control the intensity of a received signal during the presence checking.

Figure 4:
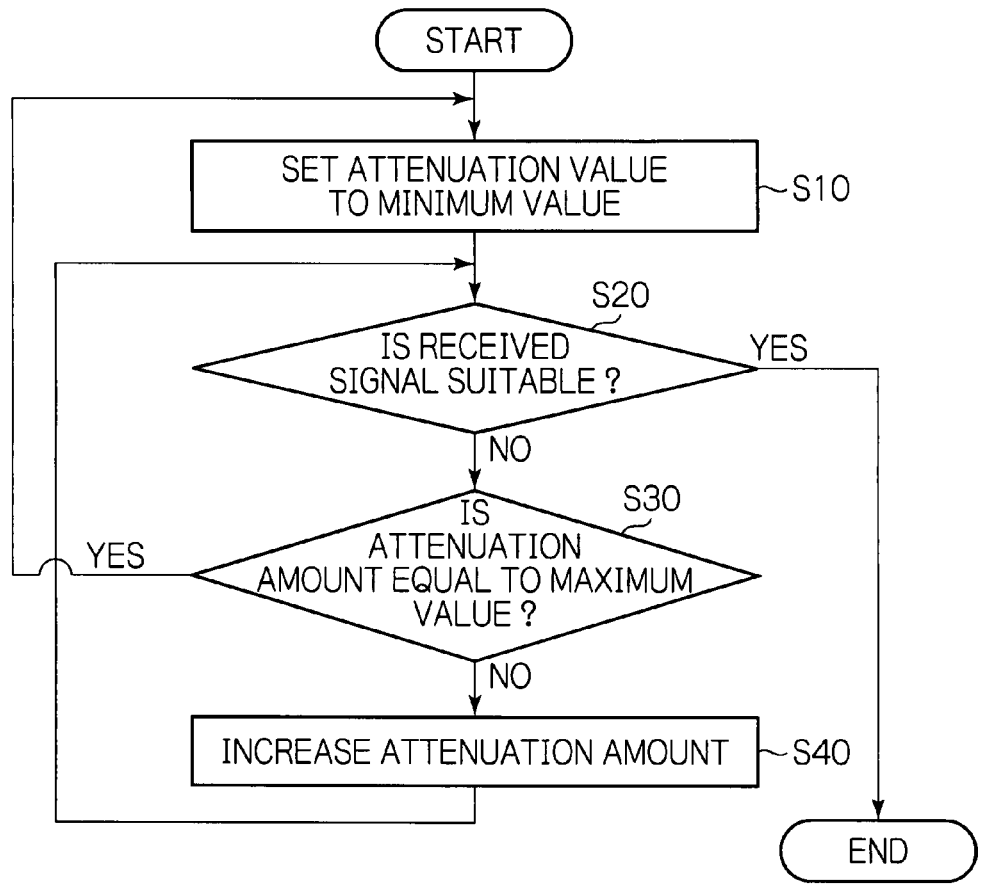
FIG. 4 is a flowchart useful for understanding the operation of attenuation control in the optical network unit.
Figure 5:
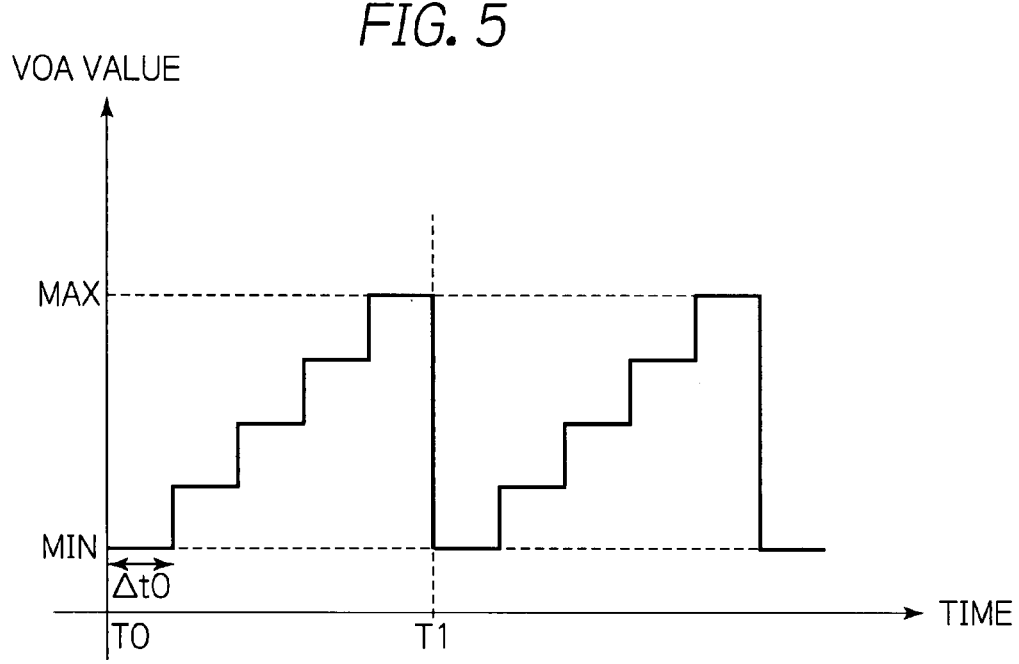
FIG. 5 schematically plots an attenuation amount in a variable optical attenuator of the optical network unit with the received-signal intensity adjusted.

Now with reference to FIGS. 4 and 5, it will be described how the received-signal intensity is adjusted or controlled in the optical network unit 300. FIG. 4 is a flowchart useful for understanding the operation of attenuation control in the optical network unit 300. FIG. 5 is a timing chart useful for understanding how to adjust the received-signal intensity in the optical network unit 300. FIG. 5 shows how the VOA value changes during one optical network unit 300 proceeding to an ONU receiving level adjusting process. FIG. 5 has its horizontal and vertical axes representing time (t) and the value of attenuation amount (VOA value) for the variable optical attenuator 370, respectively.

Figure 3:
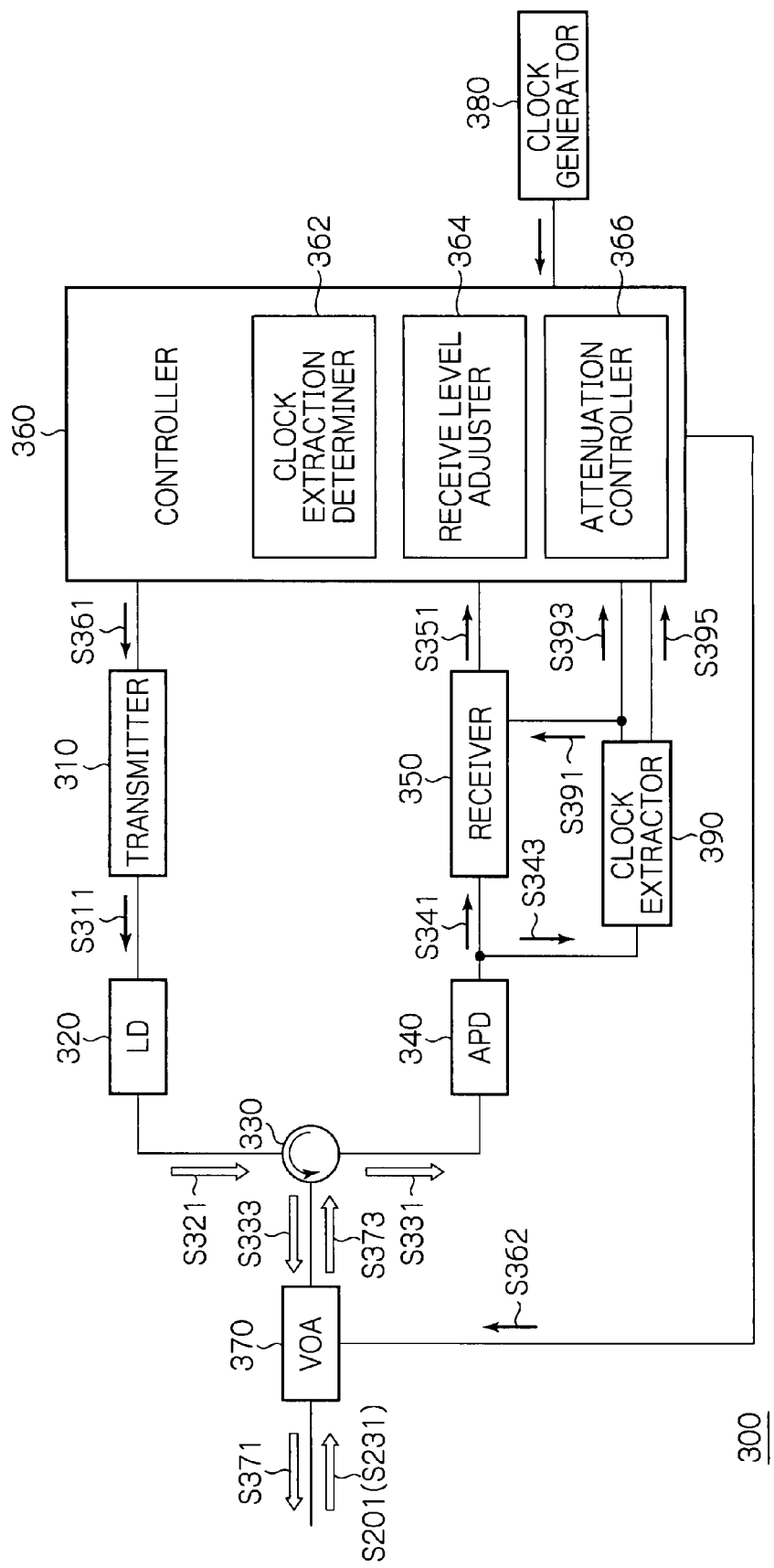
FIG. 3 is a schematic block diagram showing the optical network unit of the PON system.

First, in a step S10, the receiving level adjuster 364, FIG. 3, sets an attenuation value to a predetermined minimum value MIN. The minimum value MIN may be determined depending on the specifications of the variable optical attenuator 370 and readably stored in a storage, not shown, included in the optical network unit 300. The receiving level adjuster 364 reads out the minimum value from the storage to set the attenuation value to the minimum value, at time T0 shown in FIG. 5.

The attenuation controller 366 sends information S362 on the attenuation value set by the receiving level adjuster 364 to the variable optical attenuator 370. The variable optical attenuator 370 changes its attenuation amount according to the received attenuation value S362. It is to be noted that the variable optical attenuator 370 is adapted to attenuate not only the optical signal S201 or S231 received by the optical network unit 300 but also the optical signal S371 to be transmitted by the optical network unit 300 toward the optical line terminal 200 by the same attenuation value.

Next, in a step S20, it is decided whether or not the received signal is suitable. In the step S20, particularly, the clock extraction decider 362 decides whether or not the clock extractor 390 stably extracts the clock. This decision is performed by using the clock extraction information signal S395 generated by the clock extractor 390. Where the clock extraction information signal S395 takes the form of LOL signal, the clock extraction decider 362 acts as detecting the negative-going edge, i.e. from "1" to "0", of the LOL signal for the decision, at time T1 shown in FIG. 5.

Meanwhile, if the decision were performed by detecting the negative-going edge only, a noise or the like would possibly cause a wrong decision. It is therefore preferable to determine whether or not the LOL signal keeps the state of binary "0" following the negative-going edge for a predetermined period of time.

When the deciding result from the step S20 indicates "YES", namely the clock is extracted stably, the adjusting process for the received-signal intensity is completed. Then, the optical network unit 300 analyzes the header of a frame included in the received signal S231 and checks whether or not a presence check request is included therein. If included, then a presence check request acknowledgement signal will be transmitted toward the optical line terminal 200.

By contrast, when the deciding result from the step S20 indicates "NO", i.e. a clock is not extracted stably, the processing advances to a step S30 subsequently.

In the step S30, the receiving level adjuster 364 decides whether or not the attenuation amount is equal to a predetermined maximum value MAX. The receiving level adjuster 364 reads out the maximum value from the storage, not shown, included in the optical network unit 300 to compare the maximum value with the currently set attenuation value. The minimum value MAX may be determined depending on the specifications of the variable optical attenuator 370 and readably stored in the storage.

When the deciding result of the step S30 indicates "YES" to decide that the attenuation value is equal to the maximum value, the processing returns to the step S10. In other words, the attenuation value for the variable optical attenuator 370 is changed to the minimum value (at time T1 in FIG. 5).

On the other hand, the deciding result from the step S30 indicates "NO", namely the attenuation value is not equal to the maximum value, the processing advances to a step S40 subsequently. In the step S40, the receiving level adjuster 364 increments the attenuation value by one or unit step of predetermined amount. The amount of one step by which the attenuation value is incremented or decremented may be preferably determined to an arbitrary value according to, for example, the variable range of the variable optical attenuator 370. After the attenuation value is increased by one step, the processing returns to the step S20.

The adjustment of the received-signal intensity is repeated until the clock extraction decider 362 stably extracts a clock.

FIG. 5 depicts a time interval Δt0 in which the attenuation value is changed and which may be determined according to, for example, the response time of the variable optical attenuator 370 or a time during which the step S20 requires for determining the binary state following a negative-going edge of an LOL signal as described above.

Figure 6A:
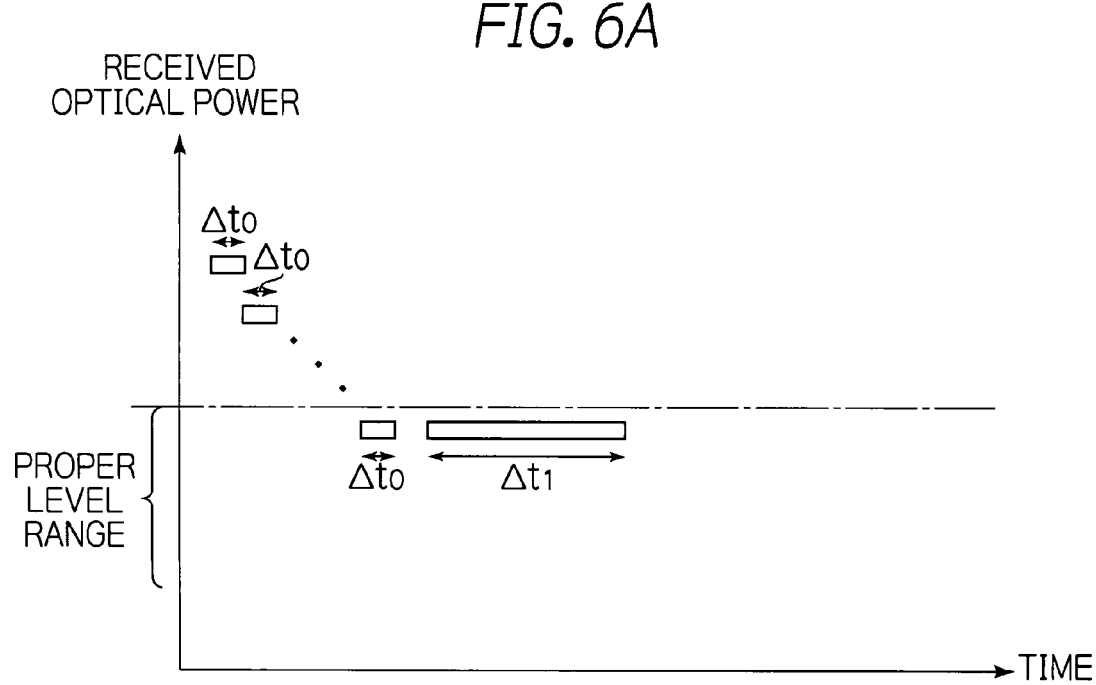
FIGS. 6A and 6B visually illustrate a received optical power in the optical network unit with the received-signal intensity adjusted.
Figure 6B:
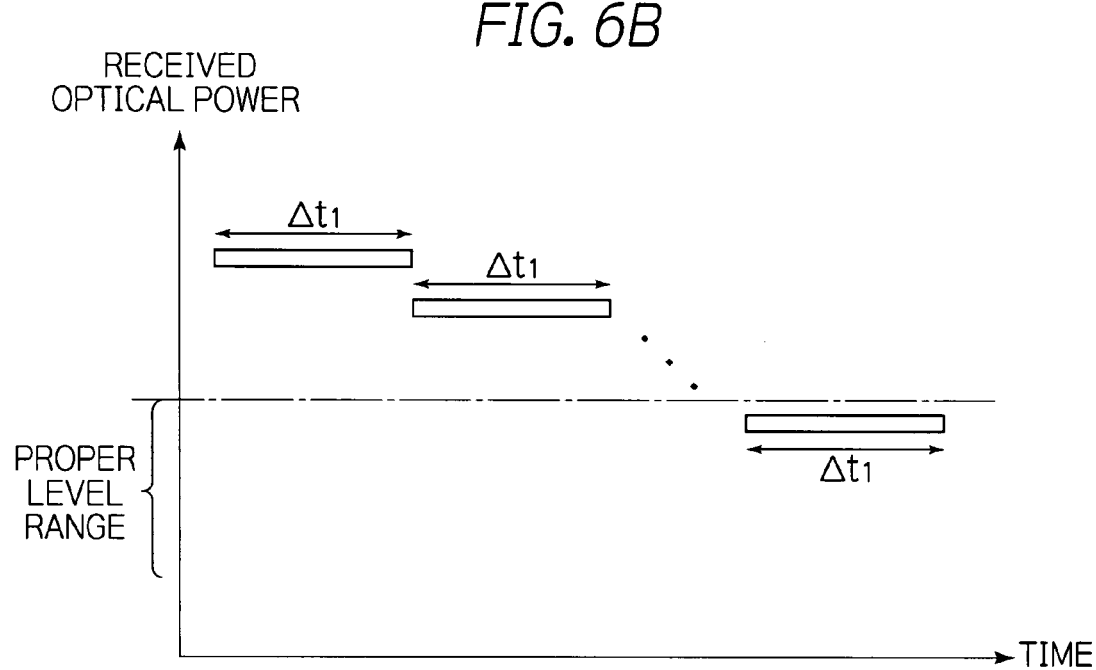

In FIGS. 6A and 6B, the horizontal and vertical axes represent time (t) and a received optical power, respectively. The adjustment of the received-signal intensity described with reference to FIG. 4 uses an LOL signal to decide whether or not a clock is extracted to set the received-signal intensity accordingly. Therefore, until the receiving power reaches a proper level, the VOA value, or received optical power, is changed at the time interval Δt0 determined according to, for example, the response time of the variable optical attenuator 370. After the received optical power reaches the proper level for extracting the clock stably, the header is analyzed to check the reception of a presence check request signal. Thus, the presence check can be performed quickly for the period of time determined according to the response time of the variable optical attenuator 370, as shown in FIG. 6A.

For example, instead of using the LOL signal, the header of the received signal may be analyzed to thereby check the reception of a presence check request signal. However, the use of the header analysis may require the time for presence check to depend upon not only the response time of the variable optical attenuator 370 but also the time necessary for analyzing the header. Therefore, the use of the header analysis renders the time interval Δt1, FIG. 6B, required for changing the attenuation value longer than the time interval Δt0 required when using the LOL signal. The time required for the presence check is longer accordingly, as shown in FIG. 6B.

As described above, in accordance with the illustrative embodiment of the present invention, the optical network unit 300 controls, when having its presence checked, the intensity of an optical signal received from the optical line terminal 200. That makes the intensity of the optical signal received by the optical network unit 300 kept within the dynamic range to thereby ensure that the presence check request signal is received from the optical line terminal 200.

Additionally, when the attenuation amount is controlled by using an LOL signal from the CDR circuit, the header does not need to be analyzed during the adjustment of the received-signal intensity. Therefore, the time required for using an LOL signal to determine whether or not the clock exists is shorter than the time required for analyzing the header, thus completing the adjustment of the received-signal intensity for a shorter time.

The illustrative embodiment described above is directed to an exemplified case where the received-signal intensity is adjusted by changing the attenuation value from the minimum to the maximum value in order. However, the present invention is not to be understood as restrictive to such a case. The received-signal intensity may also be adjusted by changing the attenuation value from the maximum to the minimum value in order. In this sense, the minimum and maximum values may be referred to as extreme values which are opposite to. each other. Additionally, the present invention may not be restricted to the telecommunications system relying on the CDM scheme, but can also be applied to PON systems based upon other telecommunications schemes, such as TDM (Time Division Multiplexing) and WDM (Wavelength Division Multiplexing).

The entire disclosure of Japanese patent application No. 2009-164631 filed on Jul. 13, 20109, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What I claim is:

1. A subscriber terminal for use in an optical communication network including a central-office apparatus, comprising:
    a variable optical attenuator for attenuating an optical signal received from the central-office apparatus;
    an optical-electric converter for converting the optical signal received via said variable optical attenuator to a corresponding electric signal;
    a clock extractor for extracting a clock from the electric signal and producing a clock extraction information signal representing whether or not the clock is extracted stably; and
    a controller for controlling said variable optical attenuator, said controller including:
    a clock extraction decider for determining whether or not said clock extractor stably extracts the clock on a basis of the clock extraction information signal;
    a receiving level adjuster for setting an attenuation value to a value between a predetermined minimum value and a predetermined maximum value; and
    an attenuation controller for setting the attenuation amount for said variable optical attenuator to the attenuation value.

2. The subscriber terminal in accordance with claim 1, wherein said clock extractor comprises a clock data recovery circuit, the clock extraction information signal being a loss of lock signal from said clock data recovery circuit.

3. The subscriber terminal in accordance with claim 2, wherein said clock extraction decider detects a negative-going edge of the loss of lock signal to determine said clock extractor stably extracting the clock.

4. The subscriber terminal in accordance with claim 3, wherein said clock extraction decider determines said clock extractor stably extracting the clock when the loss of lock signal has kept one binary state following the negative-going edge for a predetermined period of time.

5. The subscriber terminal in accordance with claim 1, wherein said controller controls said variable optical attenuator while a presence of said terminal is checked by the central-office apparatus.

6. An optical communication network comprising a central-office apparatus and a plurality of subscriber terminals connected to the central-office apparatus, wherein said subscriber terminal comprises:
    a variable optical attenuator for attenuating an optical signal received from the central-office apparatus;
    an optical-electric converter for converting the optical signal received via said variable optical attenuator to a corresponding electric signal;
    a clock extractor for extracting a clock from the electric signal and producing a clock extraction information signal representing whether or not the clock is extracted stably; and
    a controller for controlling said variable optical attenuator, said controller including:
    a clock extraction decider for determining whether or not said clock extractor stably extracts the clock on a basis of the clock extraction information signal;
    a receiving level adjuster for setting an attenuation value to a value between a predetermined minimum value and a predetermined maximum value; and
    an attenuation controller for setting the attenuation amount for said variable optical attenuator to the attenuation value.

7. The network in accordance with claim 6, wherein said clock extractor comprises a clock data recovery circuit, the clock extraction information signal being a loss of lock signal from said clock data recovery circuit.

8. The network in accordance with claim 7, wherein said clock extraction decider detects a negative-going edge of the loss of lock signal to determine said clock extractor stably extracting the clock.

9. The network in accordance with claim 8, wherein said clock extraction decider determines said clock extractor stably extracting the clock when the loss of lock signal has kept one binary state following the negative-going edge for a predetermined period of time.

10. The network in accordance with claim 6, wherein said controller controls said variable optical attenuator while a presence of said terminal is checked by the central-office apparatus.

11. The network in accordance with claim 6, wherein said network is a passive optical communication network.

12. A method for adjusting intensity of an optical signal in a subscriber terminal for use in an optical communication network including a central-office apparatus, the subscriber terminal including: a variable optical attenuator for attenuating an optical signal received from the central-office apparatus; an optical-electric converter for converting the optical signal received via the variable optical attenuator to a corresponding electric signal; a clock extractor for extracting a clock from the electric signal and producing a clock extraction information signal representing whether or not the clock is extracted stably; and a controller for controlling the variable optical attenuator,
    said method comprising the steps of:
    changing an attenuation amount for the variable optical attenuator to one predetermined extreme value;
    determining whether or not the clock extractor stably extracts the clock;
    determining, when it is determined that the clock is not extracted stably, whether or not the attenuation amount is equal to another predetermined extreme value opposite to the one extreme value; and
    changing the attenuation amount to the one extreme value subsequently when the attenuation amount is equal to the other extreme value, or changing the attenuation amount by a unit step of predetermined amount toward the other extreme value subsequently when the attenuation amount is not equal to the other extreme value, and then, determining whether or not the clock extractor stably extracts the clock.

13. The method in accordance with claim 12, wherein the one extreme value and the other extreme value are predetermined to a minimum value and a maximum value tolerable to the attenuation amount, respectively.

14. The method in accordance with claim 12, wherein the one extreme value and the other extreme value are predetermined to a maximum value and a minimum value tolerable to the attenuation amount, respectively.

* * * * *

UNITED STATES PATENT AND TRADEMARK OFFICE
CERTIFICATE OF CORRECTION

PATENT NO. : 8,280,252 B2  Page 1 of 1
APPLICATION NO. : 12/801356
DATED : October 2, 2012
INVENTOR(S) : Masahiro Sarashina It is certified that error appears in the above-identified patent and that said Letters Patent is hereby corrected as shown below:

On the Title Page, Item (54) and Col. 1, lines 1-4 (in the Title)

"SUBSCRIBER TERMINAL OF ADJUSTING INTENSITY OF OPTICAL SIGNAL BY CONTROLLING ATTENUATION, AND A METHOD THEREOF" should be changed to --SUBSCRIBER TERMINAL OF ADJUSTING INTENSITY OF OPTICAL SIGNAL BY CONTROLLING ATTENUATION, AND A METHOD THEREFOR--

Signed and Sealed this
Eighth Day of January, 2013

David J. Kappos
*Director of the United States Patent and Trademark Office*